United States Patent
Pelc et al.

(10) Patent No.: US 10,823,912 B1
(45) Date of Patent: Nov. 3, 2020

(54) SILICON PHOTONICS USING OFF-CUT WAFER HAVING TOP-SIDE VERTICAL OUTCOUPLER FROM ETCHED CAVITY

(71) Applicant: Apple Inc., Cupertino, CA (US)

(72) Inventors: Jason Pelc, Sunnyvale, CA (US); Pat Wright, San Jose, CA (US); Peter L. D. Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/582,926

(22) Filed: Sep. 25, 2019

Related U.S. Application Data (60) Provisional application No. 62/737,675, filed on Sep. 27, 2018.

(51) Int. Cl.
| | |
|---|---|
| *G02B 6/122* | (2006.01) |
| *G02B 6/132* | (2006.01) |
| *G02B 6/42* | (2006.01) |
| *G02B 6/136* | (2006.01) |
| *G02B 6/12* | (2006.01) |

(52) U.S. Cl.
CPC ............ *G02B 6/122* (2013.01); *G02B 6/132* (2013.01); *G02B 6/136* (2013.01); *G02B 6/4214* (2013.01); *G02B 2006/12061* (2013.01)

(58) Field of Classification Search
CPC ...... G02B 6/122; G02B 6/132; G02B 6/4214; G02B 6/136; G02B 2006/12061
See application file for complete search history.

(56) References Cited

U.S. PATENT DOCUMENTS

| | | | | |
|---|---|---|---|---|
| 5,135,605 A | * | 8/1992 | Blonder | G02B 6/122 216/47 |
| 5,182,787 A | * | 1/1993 | Blonder | G02B 6/122 385/130 |
| 6,112,005 A | * | 8/2000 | Liu | H01L 31/02165 257/E31.123 |
| 9,025,926 B2 | * | 5/2015 | Chang | G02B 6/1221 385/131 |
| 9,182,544 B2 | * | 11/2015 | Kobrinsky | G02B 6/4245 |
| 9,229,179 B2 | * | 1/2016 | Ishibashi | G02B 6/12002 |
| 9,377,594 B2 | * | 6/2016 | Liff | G02B 6/4214 |
| 9,470,864 B1 | * | 10/2016 | Yo | G02B 6/428 |
| 9,507,086 B2 | * | 11/2016 | Kobrinsky | G02B 6/428 |
| 9,664,858 B2 | * | 5/2017 | Mohammed | G02B 6/36 |

(Continued)

*Primary Examiner* — Andrew Jordan
(74) *Attorney, Agent, or Firm* — Brownstein Hyatt Farber Schreck, LLP (57) ABSTRACT

Described herein is a top-side vertical outcoupler for use in an integrated photonics device. The integrated photonics device can include a photonics circuit, where light can propagate through waveguide(s) to outcoupler(s). The outcoupler(s) can redirect the light to optics, which can then collimate, focus, and/or direct the light to a launch region located on an external surface of the device. The integrated photonics device can include a plurality of layers deposited on a supporting layer. The plurality of layers can be used to form the waveguide(s) and the outcoupler(s). By forming the outcoupler(s) of the same material as the waveguide(s), the amount of light that is lost can be reduced or minimized. Additionally, the reduced number of interfaces that the light has to pass through to reach the outcoupler(s) can allow for better control of the divergence angles of the emitted light.

20 Claims, 6 Drawing Sheets

(56) References Cited

U.S. PATENT DOCUMENTS

| | | | |
|---|---|---|---|
| 10,018,781 B1 * | 7/2018 | Masuda | G02B 6/4239 |
| 10,025,044 B1 * | 7/2018 | Masuda | G02B 6/4245 |
| 10,054,737 B2 * | 8/2018 | Kobrinsky | H04B 10/25 |
| 10,261,256 B2 * | 4/2019 | Beausoleil | G02B 6/26 |
| 10,539,752 B2 * | 1/2020 | Masuda | G02B 6/4239 |
| 10,613,282 B2 * | 4/2020 | Cyr | G02B 6/4245 |
| 10,634,843 B2 * | 4/2020 | Bayn | G02B 6/13 |
| 10,650,110 B2 * | 5/2020 | Van Vaerenbergh | G06F 30/39 |
| 2005/0069253 A1 * | 3/2005 | Heideman | G02B 6/42 385/31 |
| 2011/0136063 A1 * | 6/2011 | Nottola | G02B 6/4214 430/321 |
| 2013/0279845 A1 * | 10/2013 | Kobrinsky | G02B 6/12004 385/14 |
| 2014/0086527 A1 * | 3/2014 | Ban | G02B 6/4214 385/33 |
| 2014/0153881 A1 * | 6/2014 | Liff | G02B 6/43 385/89 |
| 2014/0177995 A1 * | 6/2014 | Mohammed | G02B 6/4214 385/14 |
| 2014/0199015 A1 * | 7/2014 | Chang | G02B 6/136 385/9 |
| 2014/0203175 A1 * | 7/2014 | Kobrinsky | H01L 24/83 250/214.1 |
| 2014/0348462 A1 * | 11/2014 | Yabre | G02B 6/42 385/14 |
| 2017/0131469 A1 * | 5/2017 | Kobrinsky | H04B 10/40 |
| 2018/0024292 A1 * | 1/2018 | Beausoleil | G02B 6/13 |
| 2018/0189425 A1 * | 7/2018 | Van Vaerenbergh | G02B 6/43 |
| 2018/0364426 A1 * | 12/2018 | ten Have | G02B 6/4213 |
| 2019/0204507 A1 * | 7/2019 | Beausoleil | G02B 6/26 |
| 2019/0324203 A1 * | 10/2019 | Bayn | G02B 6/1228 |
| 2020/0084050 A1 * | 3/2020 | Mensch | G06F 16/901 |

* cited by examiner

SILICON PHOTONICS USING OFF-CUT WAFER HAVING TOP-SIDE VERTICAL OUTCOUPLER FROM ETCHED CAVITY

CROSS-REFERENCE TO RELATED APPLICATIONS

This application claims the benefit under 35 U.S.C. § 119(e) of U.S. Patent Application No. 62/737,675, filed Sep. 27, 2018, the contents of which are herein incorporated by reference in their entirety for all purposes.

FIELD

This disclosure relates to top-side vertical outcouplers for use in photonics devices.

BACKGROUND

Optical sensing systems can include photonics devices. In some instances, a photonics device can be arranged such that light must be optically coupled out of a photonics circuit. One component that can optically couple light out of a photonics circuit can be a top-side vertical outcoupler.

SUMMARY

Described herein is a top-side vertical outcoupler for use in an integrated photonics device. The integrated photonics device can include a photonics circuit, where light can propagate through one or more waveguides to one or more outcouplers. The outcoupler(s) can redirect the light to optics, which can then collimate, focus, and/or direct the light to a launch region located on an external surface of the device.

The integrated photonics device can include a plurality of layers formed on a supporting layer. The plurality of layers may be formed by bonding, depositing, etching, or any combination thereof, or any other appropriate technique. The plurality of layers can be used to form the waveguide(s) and the outcoupler(s). By forming the outcoupler(s) of the same material as the waveguide(s), the amount of light that is lost can be reduced or minimized. Additionally, the reduced number of interfaces or zero interfaces that the light has to pass through to reach the outcoupler(s) can allow for better control of the divergence angles of the emitted light. Light can be incident on the outcoupler(s) which may either redirect the emitted light out of the plurality of layers or reflect the light back through the plurality of layers due to total internal reflection.

The outcoupler(s) can be formed by using etch steps for removing material from the plurality of layers. The plurality of layers can be layers included in a wafer and can include one or more propagation layers and one or more cladding layers. For example, the plurality of layers can include a silicon on insulator (SOI) layer propagation layer, a silicon nitride cladding layer, and a buried oxide (BOX) cladding layer disposed on a silicon supporting layer. Different etch steps can be used to selectively remove portions of the plurality of layers. The outcoupler(s) can be top-side vertical outcouplers that are formed using an off-cut wafer. In some examples, at least one layer of the wafer can be off-cut from a certain crystal plane, which can allow any etching of at least some of the plurality of layers to preferentially terminate on a plane. In some instances, the plane can form the outcoupler(s) and can have a certain or predetermined angle relative to the supporting layer.

An integrated photonics device including: a supporting layer; a plurality of layers deposited on the supporting layer, where the plurality of layers includes: one or more waveguides for propagating light, and one or more outcouplers for receiving the light and redirecting the light towards one or more optics, where the one or more outcouplers includes portions formed from at least two of the plurality of layers; a cavity in the at least two of the plurality of layers, where a wall of the cavity is formed by the one or more outcouplers; and an anti-reflection layer disposed on the plurality of layers, where the anti-reflection layer extends over the portions of the one or more outcouplers. Additionally or alternatively, in some examples, the plurality of layers includes silicon nitride, and the supporting layer includes silicon. Additionally or alternatively, in some examples, the one or more outcouplers exclude a metallic reflective layer. Additionally or alternatively, in some examples, the one or more waveguides are located in a light generation region of the plurality of layers, and the one or more outcouplers are located in a light launch region of the plurality of layers. Additionally or alternatively, in some examples, the anti-reflection coating layer is disposed on at least some of the plurality of layers in the light launch region. Additionally or alternatively, in some examples, the anti-reflection coating layer is further a hard mask for the plurality of layers. Additionally or alternatively, in some examples, the at least two of the plurality of layers include a routing layer and a propagation layer. Additionally or alternatively, in some examples, the integrated photonics device may further include: an insulating material that fills the cavity, the insulating material contacting at least one of the one or more outcouplers, where the insulating material is separate and distinct from the plurality of layers. Additionally or alternatively, in some examples, the plurality of layers and the supporting layer are included in a wafer, and the wafer is an off-cut wafer. Additionally or alternatively, in some examples, another wall of the cavity is formed by an insulating layer, a propagation layer, and a cladding layer. Additionally or alternatively, in some examples, no gap exists between the one or more waveguides and the one or more outcouplers.

A method for forming an integrated photonics device is disclosed. The method can include: providing a wafer, the wafer including a supporting layer and a plurality of layers on the supporting layer; and forming one or more outcouplers from at least two of the plurality of layers, the formation of the one or more outcouplers including: depositing a hard mask layer on at least one of the plurality of layers, patterning the hard mask layer to form one or more openings next to a light launch region of the plurality of layers, and creating the one or more outcouplers by etching at least some of the plurality of layers through the one or more openings. Additionally or alternatively, in some examples, the method may further include: forming one or more waveguides in a light generation region of the plurality of layers. Additionally or alternatively, in some examples, the one or more waveguides are located at a light generation region of the plurality of layers, and the one or more outcouplers are located at the light launch region of the plurality of layers. Additionally or alternatively, in some examples, the creation of the one or more outcouplers includes: removing first portions of a first layer of the plurality of layers; removing portions of a second layer of the plurality of layers; and removing second portions of the first layer of the plurality of layers. Additionally or alternatively, in some examples, removing first portions of the first layer may include etching the first layer in a first direction, which may further include: after removing first portions of the first layer, where removing portions of the second layer may include etching the second layer in at least a second direction, and before removing second portions of the first layer, etching the first layer in the first direction and etching the second layer in at least the second direction. Additionally or alternatively, in some examples, the removal of the portions of the second layer includes etching using a hydrofluoric solution. Additionally or alternatively, in some examples, the removal of the first portions of the first layer includes etching using dry etching. Additionally or alternatively, in some examples, the removal of the second portions of the first layer includes etching using a potassium hydroxide solution or a tetramethylammonium hydroxide solution. Additionally or alternatively, in some examples, the removal of the second portions of the first layer include using an etch solution that preferentially terminates etching the first layer along a plane. Additionally or alternatively, in some examples, the removal of the first portions of the first layer, the portions of the second layer, and the second portions of the first layer form a cavity, the method further including filling the cavity with one or more materials.

An integrated photonics device formed by a process is disclosed. The process can include the steps of: providing a wafer, the wafer including a supporting layer and a plurality of layers on the supporting layer; and forming one or more outcouplers from at least two of the plurality of layers, the formation of the one or more outcouplers including: depositing a hard mask layer on at least one of the plurality of layers, patterning the hard mask layer to form one or more openings next to a light launch region of the plurality of layers, and creating the one or more outcouplers by etching at least some of the plurality of layers through the one or more openings.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Described herein is a top-side vertical outcoupler for use in an integrated photonics device. The integrated photonics device can include a photonics circuit, where light can propagate through one or more waveguides to one or more outcouplers. The outcoupler(s) can redirect the light to optics, which can then collimate, focus, and/or direct the light to a launch region located on an external surface of the device.

The plurality of layers can be used to form the waveguide(s) and the outcoupler(s). By forming the outcoupler(s) of the same material as the waveguide(s), the amount of light that is lost can be reduced or minimized. Additionally, the reduced number (e.g., zero) of interfaces that the light has to pass through to reach the outcoupler(s) can allow for better control of the divergence angles of the emitted light. Light can be incident on the outcoupler(s) to redirect the emitted light due to total internal reflection. Additionally and alternatively, in some examples, the light may be redirected by a reflective metallic layer.

The outcoupler(s) can be formed by using etch steps for removing material from the plurality of layers. The plurality of layers can be layers included in a wafer and can include one or more propagation layers and one or more cladding layers. For example, the plurality of layers can include a silicon on insulator (SOI) layer, which may be a propagation layer, a silicon nitride cladding layer, and a buried oxide (BOX) cladding layer disposed on a silicon supporting layer. Different etch steps can be used to selectively remove portions of the plurality of layers. The outcoupler(s) can be top-side vertical outcouplers that may be formed using an off-cut wafer. In some examples, at least one layer of the wafer can be off-cut from a certain crystal plane, which can allow any etching of at least some of the plurality of layers to preferentially terminate on a plane. In some instances, the plane can form the outcoupler(s) and can have a certain or predetermined angle relative to the supporting layer.

Directional terminology, such as "top", "bottom", "upper", "lower", "above", "below", "beneath", "front", "back", "over", "under", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

These and other embodiments are discussed below with reference to FIGS. 1-3. However, those skilled in the art will readily appreciate that the detailed description given herein with respect to these figures is for explanatory purposes only and should not be construed as limiting.

Arrangement of a Portion of an Integrated Photonics Device

Figure 1:
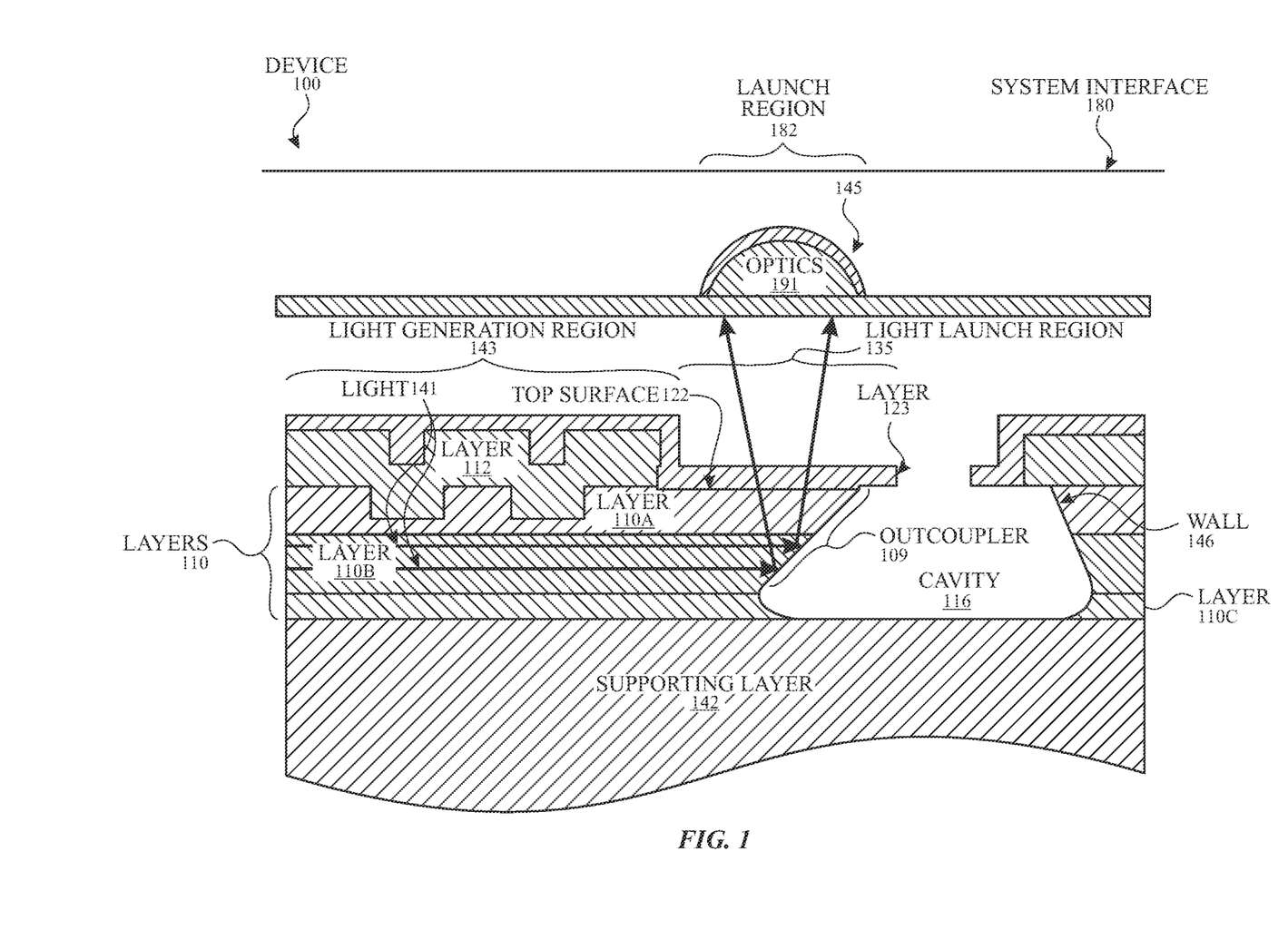
FIG. 1 illustrates a cross-sectional view of a portion of an example integrated photonics device.

FIG. 1 illustrates a cross-sectional view of a portion of an example integrated photonics device. The device can include one or more windows (not shown in FIG. 1) located at or proximate to a system interface 180. Additionally, the device 100 can include additional optical components not illustrated in FIG. 1.

The device 100 can include a system interface 180. The system interface 180 can include one or more launch regions 182 and one or more collection regions (not shown in FIG. 1). The launch region(s) can be configured to allow light 141, redirected by an outcoupler 109, and collected by optics 191 to exit the device 100 at the system interface 180. The device 100 can include one or more layers of optics, such as optics 191, which overlay one or more outcouplers 109. The optics 191 can be located, for example, in the light path between an outcoupler 109 (e.g., outcoupler) and the system interface 180.

The device 100 can also include layers 110A and 110B. The layers 110A and 110B can include any type of material such as silicon and in some instances, the layers 110A and 110B can be an off-cut wafer. Further, although the layers 110A and 110B are illustrated as two separate layers in FIG. 1, in some examples, layers 110A and 110B may be a single layer. The orientation of the off-cut wafer can affect the resulting angle of the outcoupler 109. As discussed below, a selective wet etch of the off-cut wafer can cause a preferential termination of the etching on a plane, where the plane can be related to the orientation of the off-cut. For example, the etch may expose the <111> plane. Further, the off-cut may place this plane at a desired angle of approximately 45 degrees to the surface of the wafer, where the surface of the wafer is approximately 9.7° off of the <100> crystal plane. The supporting layer 142 can be a <111> oriented wafer, for example. Because the wafer for the supporting layer 142 may have a different crystal orientation than the off-cut wafer of layers 110A and 110B, the wafer for the supporting layer 142 may not etch at the same angle as the off-cut wafer or may not etch at all. Examples may also include any wafer that does not have an off-cut orientation. In some examples, the supporting layer may be a bulk silicon support wafer which may be referred to as a handle wafer.

The device 100 can include a cavity 116 located between the outcoupler 109 and the wall 146. In some examples, the wall 146 and the outcoupler 109 can be walls of the cavity 116. The wall 146 can be formed from the plurality of layers 110, for example. The cavity 116 can include air or any material such as silicon dioxide.

The device may also include a plurality of layers 110, layer 112, and layer 123. The outcoupler 109 can be formed from the layers 110A and 110B, and in some examples, layers 110A and 110B may be a single layer. One or more layers, such as layers 110A and 110B can be a propagation layer used to propagate light 141 towards the outcoupler 109. Light 141 can be incident on the outcoupler 109, and the outcoupler 109 can redirect the incident light towards the system interface 180. In some examples, light propagating in a first direction and in the propagation layer (e.g., where the propagating light may be in an approximate first direction located approximately parallel to the top surface 122 of layers 110) may be incident on the outcoupler 109. The outcoupler 109 may redirect the light in a second direction (e.g., where the second direction may be different than the first direction and may be, in some examples, approximately orthogonal to the top surface 122 of layers 110), for example, approximately 90 degrees+/−20 degrees to the top surface 122. In some examples, the central rays of the redirected light may be at approximately 90 degrees+/−one degree.

The outcoupler(s) 109 can have an angle (e.g., non-perpendicular and non-parallel) relative to the top surface 122 of the layers 110. The angle of the outcoupler(s) 109 can be any angle such as 30°, 45°, 54.7°, 60°, and so forth. The light may or may not be reflected back through the layers 110A and 110B via total internal reflection (TIR), depending on the angle at which the light reflects from the outcoupler 109.

In some examples, the outcoupler 109 may be an interface between the layers 110 and the cavity 116 that can act as a mirror to redirect the light 141 incident on the outcoupler 109. By forming the outcoupler 109 of the same material as the layers 110 (e.g., waveguide), the amount of light that is lost can be reduced. Additionally, due to the lack of different material interfaces that the light passes through to reach the outcoupler, better control of the divergence angles of the emitted light may be achieved. Accordingly, light 141 can propagate within the same material (e.g., silicon) before being incident on the outcoupler 109 to minimize light loss. The interface may include one or multiple layers. For example, a portion of the outcoupler 109 can include layer 110A, and a portion of the outcoupler 109 can include layer 110B. In some examples, the layers 110A and 110B may be one layer and may form the outcoupler 109.

Once the light 141 is redirected by the outcoupler 109, a layer 123 can allow light 141 to transmit towards the optics 191. The layer 123 can be an anti-reflection coating, for example, silicon nitride or silicon dioxide, that facilitates the reduction of light loss (e.g., when compared with other coatings that are not anti-reflection coatings). For example, the layer 123 can reduce the amount of light that reflects back at the interface of the layer 110A and the layer 123. In some examples, the layer 123 can be formed or deposited on (e.g., directly contacting) the layer 110A.

The outcoupler 109 may be formed by selectively etching at least one of the layers as discussed herein. In some instances, the outcoupler 109 may be capable of redirecting (e.g., reflecting) light 141 without use of a metallic reflective layer. An opening into the deposited layer 123 may be formed to allow the outcoupler 109 to be formed. The layer 123 that remains after the opening is formed may extend over portions of the outcoupler 109. In this manner, the opening formed in the layer 123 may be smaller than the width of the cavity 116.

Optics 191 can receive light from the outcoupler 109. The optics 191 can be configured to redirect, collimate, and/or focus light towards the system interface 180. In some examples, the optics 191 can include an anti-reflection coating 145 disposed on its top surface (e.g., surface closer to the system interface 180).

The layers 110 can also be used, at least in part, to form one or more waveguides for propagating light. For example, one or more layers, such as layers 110A and 110B, can enable the propagation of light 141, and one or more layers, such as layer 110C and layer 112 can be cladding layers that confine light 141. In some examples, the layers 110A and 110B may be a single layer. For example, the layers 110A and 110B can be a silicon on insulator (SOI) layer, and the layer 110C can be a buried oxide (BOX) layer. In some instances, the layer 110A can include an insulating layer, such as silicon nitride, for insulating and/or routing layers. The device can also include other layers, such as layer 112 and layer 123. The layer 112 may also be a cladding layer. In some examples, the layer 112 may be $SiO_2$. The layer 123 may be an anti-reflection coating, a layer used as an etch mask, or both. Examples may include other layers, not shown in FIG. 1, located above and/or below the cladding layers of the waveguides.

The layer 112 can include one or more conductive layers configured to route one or more signals to one or more optical components. For example, the layer 112 can be configured to route one or more signals from a controller to control a light emitter (not shown in FIG. 1), which can emit light in response to the one or more signals. In some examples, the layer 112 can include multiple conductive layers electrically isolated by the insulating layer(s). In some instances, the layer 112 can include one or more encapsulation layers, passivation layers, planarizing layers, or the like. In some examples, the layer 112 can also include one or more insulating layers.

As shown in FIG. 1, the one or more waveguides can be located in one region (e.g., a light generation region 143) of the layers 110, and the outcoupler 109 can be located in another region (e.g., a light launch region 135) of the layers 110.

Examples may exclude one or more layers or portions of a layer shown in FIG. 1. For example, a device may exclude portions of the layer 123 on top of the waveguides or layers 110, and instead layer 112 may be deposited on top of the layers 110 instead of the layer 123 in the light launch region 135.

Fabrication of a Top-Side Vertical Outcoupler

FIGS. 2A-2F illustrate cross-sectional views of a portion of an integrated photonics device during fabrication of an example top-side vertical outcoupler. FIG. 3 illustrates an example process flow for fabricating an example top-side vertical outcoupler.

Figure 2A:
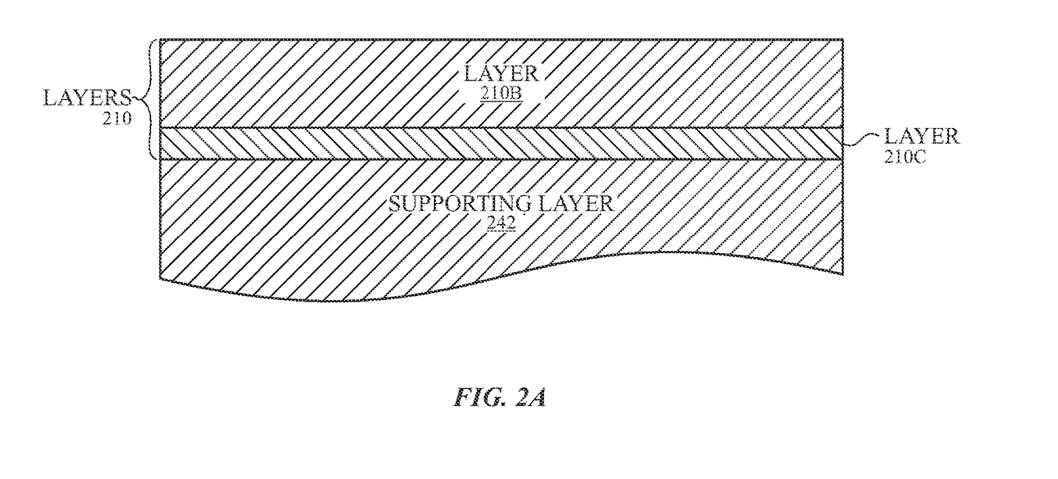
FIGS. 2A-2F illustrate cross-sectional views of a portion of an integrated photonics device during fabrication of an example top-side vertical outcoupler.

At 352 of process 350, the process can begin by providing a wafer, as shown in FIG. 2A. The wafer can include a plurality of layers 210 on top of a supporting layer 242. In some examples, the wafer can include additional layers such as layer 110A as illustrated in FIG. 1. Layer 210B, layer 210C, and supporting layer 242 can have one or more functions and/or components that are correspondingly similar to layer 110B, layer 110C, and supporting layer 142 of FIG. 1, respectively.

Figure 2B:
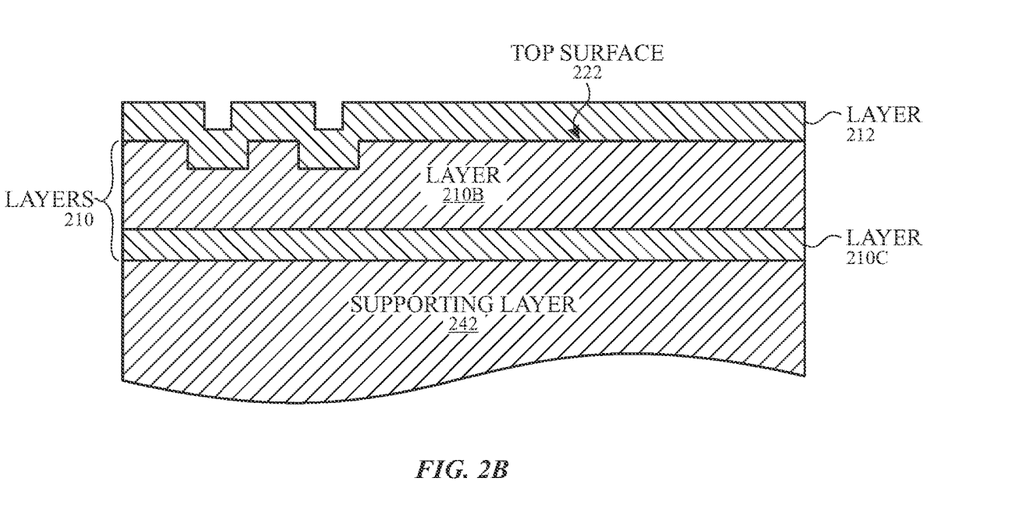

At 354, one or more layers 210 of the wafer form one or more waveguides, as shown in FIG. 2B. For example, the layer 210B and optionally, one or more additional layers, can be patterned and etched to form the waveguides. In some instances, forming the waveguides can include multiple etch steps that can include, e.g., etching to various depths that may not be shown in the example of FIG. 2B. One or more insulating layers 212 can be deposited on the top surface 222 of the layers 210 (step 356 of process 350). In some instances, the layer 212 can be a $SiO_2$ cladding layer. Layer 212 and top surface 222 of the layers 210 can have one or more functions and/or components that are correspondingly similar to layer 112 and top surface 122 of FIG. 1, respectively.

Figure 2C:
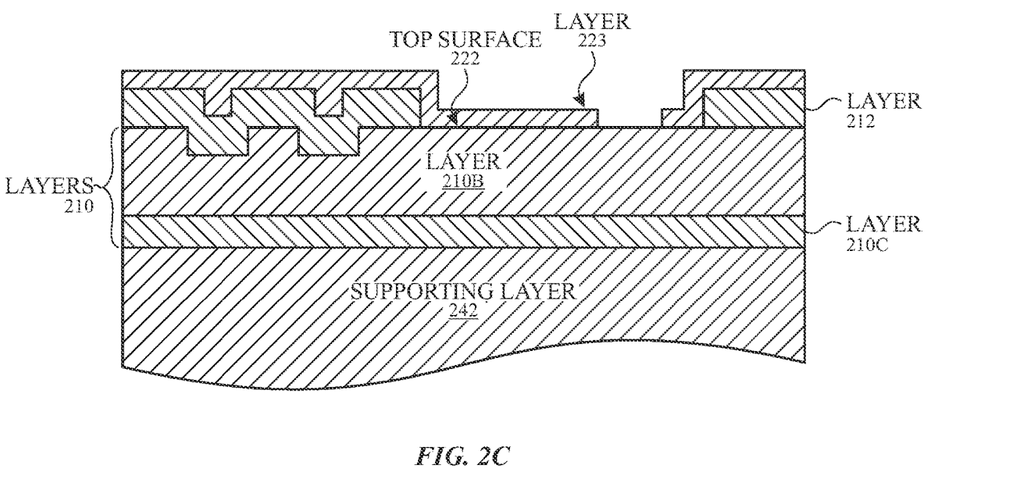

As shown in FIG. 2C, at 358, a layer 223 can be formed on the layers 212 and 210. Before forming the layer 223, portions of the layer 212 can optionally be removed from the light launch region, as shown in FIG. 2C. The layer 223 can be formed by depositing a layer of material, such as $Si_xN_y$, on top of layer 212 and the top surface 222 of the layers 210, followed by removing portions of the layer 223. The removed portions of layer 223 can be located next to the subsequently formed outcoupler (e.g., outcoupler 109 illustrated in FIG. 1).

In some instances, the layer 223 may be a multi-functional component configured as an anti-reflection coating and an etch mask. The layer 223 can serve as an anti-reflection coating and can allow light (e.g., light 141 illustrated in FIG. 1) reflected from the outcoupler 209 to exit towards optics (e.g., optics 191 illustrated in FIG. 1A and outcoupler 209 illustrated in FIG. 2F). Additionally or alternatively, the layer 223 can serve as a hard mask. A hard mask can be one or more layers of material that has certain material properties (e.g., material composition) such that isotropic or anisotropic etching of the layers 210 may be prevented, thereby allowing another etch step (step 364 illustrated in FIG. 3 and corresponding FIG. 2F) to form the outcoupler 209 (e.g., outcoupler illustrated in FIG. 2F). Portions of the layer 212 and layer 223 can be removed using etching chemistry and any etching technique including wet etching and dry etching.

Figure 2D:
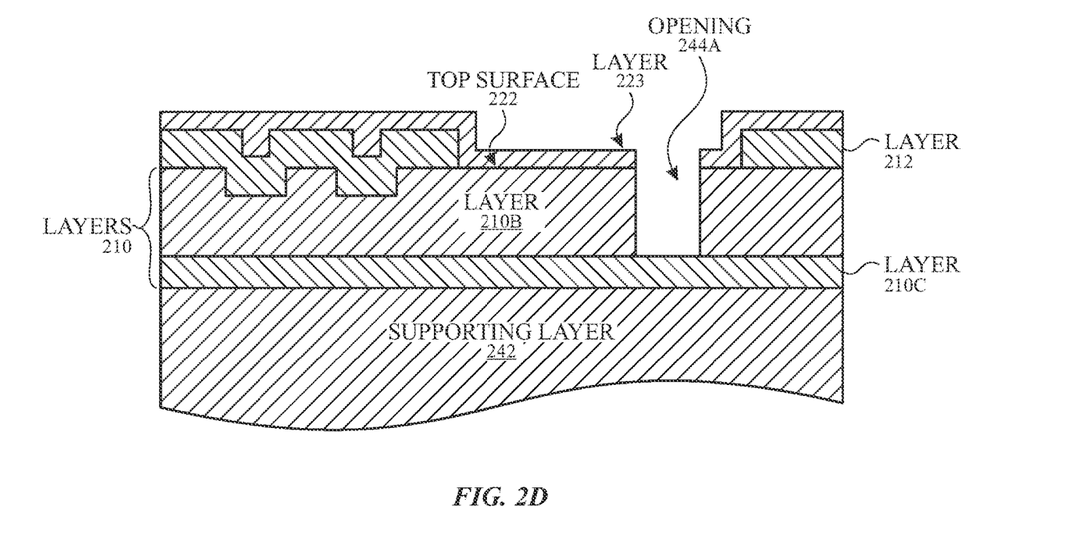
Figure 3:
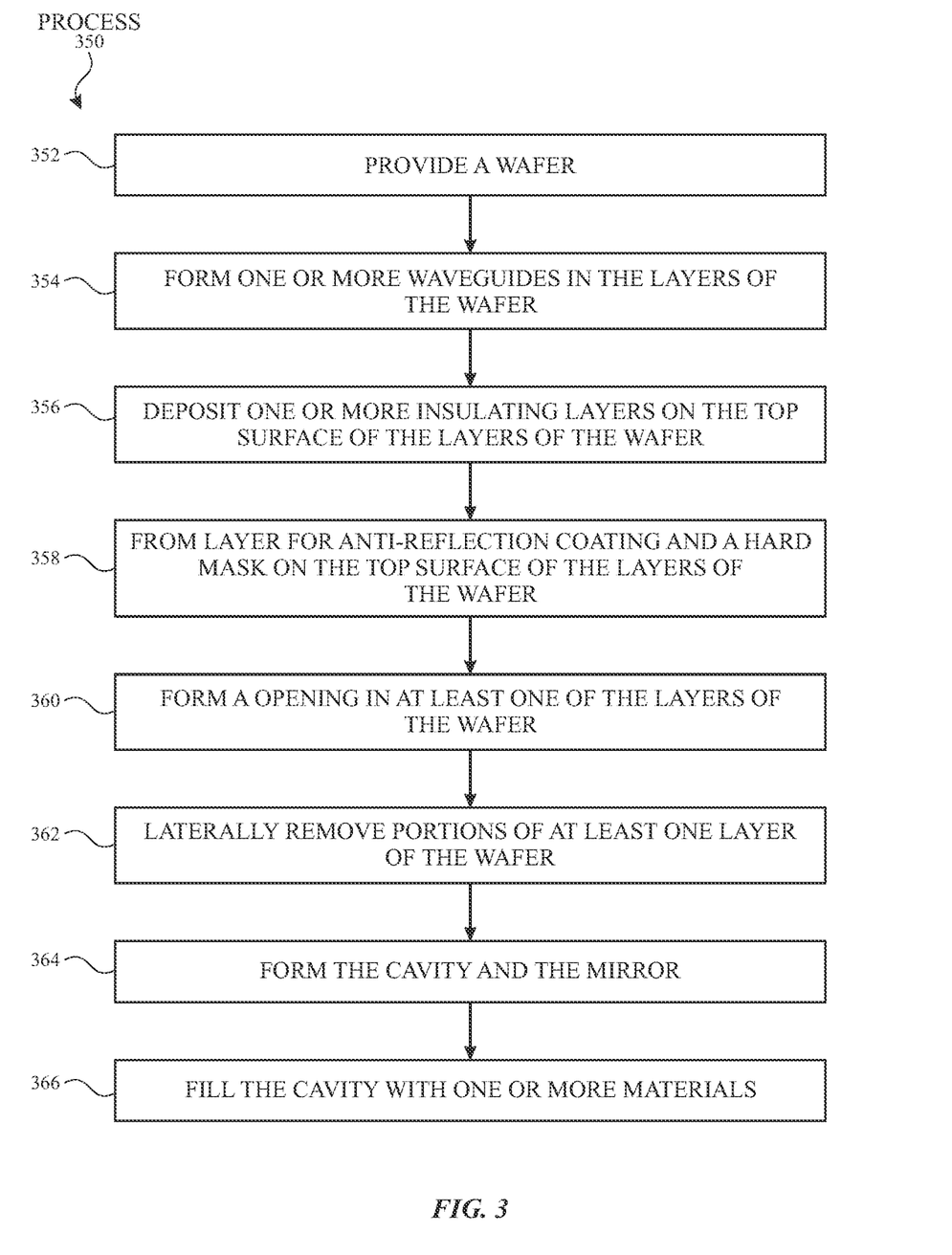
FIG. 3 illustrates an example process flow for fabricating an example top-side vertical outcoupler.

At 360 of process 350 in FIG. 3, an opening 244A, illustrated in FIG. 2D, in at least one of the layers, such as layer 210B can be formed. The layer 210B can include, for example, a SOI layer. The opening 244A can be formed using any etching chemistry and any etching technique, such as dry plasma etching. The step of etching layer 210B can terminate once the layer 210C has been reached (e.g., is exposed at the bottom of opening 244A to atmosphere). The etching chemistry can be such that the etching is selective to etching the layer 210B and has reduced etching (e.g., no etching) of the layer 210C.

Figure 2E:
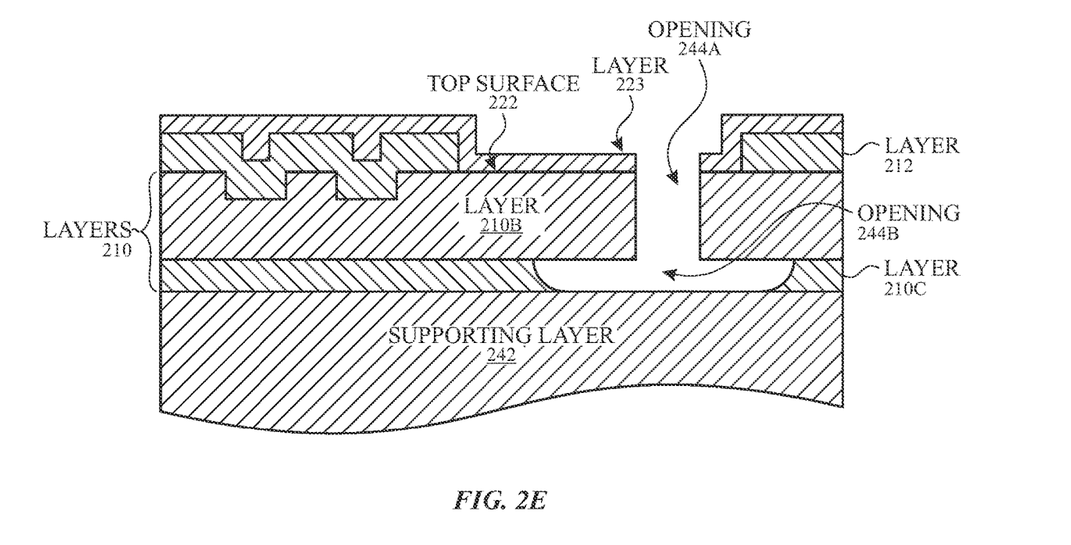
Figure 2F:
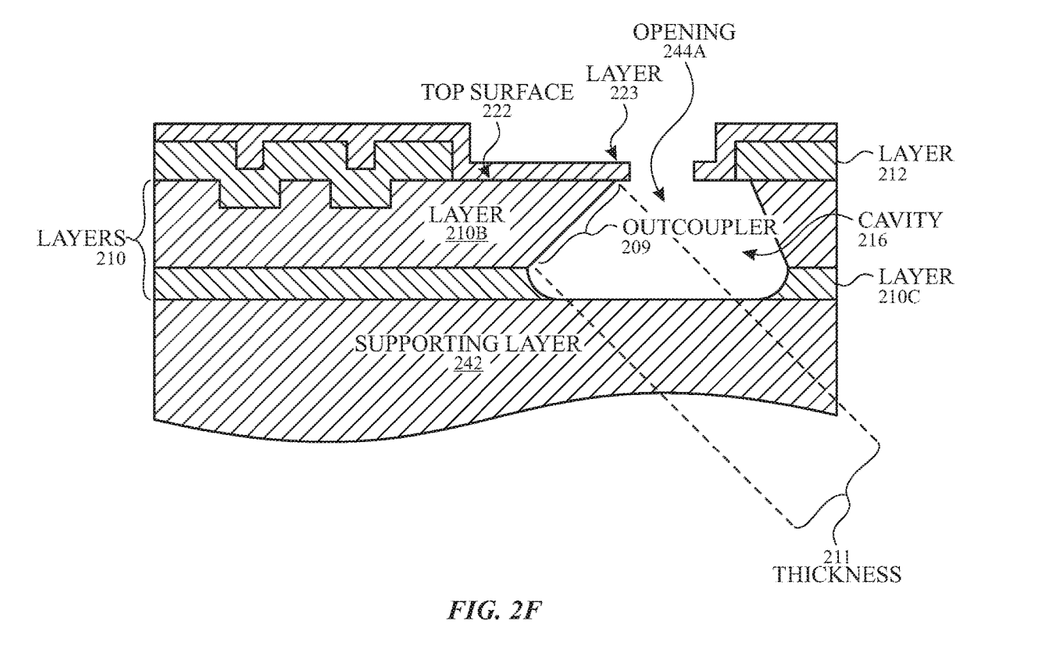

In FIG. 2E, portions of the layer 210C can be vertically and laterally removed using another etching step to create the opening 244B (step 362 of process 350). At 362, hydrofluoric (HF) vapor, buffered HF (e.g., BOE), or another HF solution such as a liquid unbuffered HF solution, may be used for the etching of layer 210C. The step of etching layer 210C can terminate once the supporting layer 242 has been reached (e.g., supporting layer 242 is exposed to atmosphere). In some examples, the lateral width of the layer 210C that is removed may be based on the targeted thickness 211 of the outcoupler 209 (e.g., outcoupler illustrated in FIG. 2F). In some examples, the material etched in layer 210C may determine the termination point of the mirror etch of layer 210B. Further to this example, layer 210C may be etched such that the lateral depth may be greater than the height of layer 210B. As such, the etching time in step 362 can be based on the targeted thickness 211 of the outcoupler or mirror 209 as illustrated in FIG. 2F. The terms outcoupler and mirror may be used interchangeably herein Portions of the layer 210B can be removed, as shown in FIG. 2F, using another etch step (step 364 of process 350). In some examples, a single etch step can be used to remove portions of the layers 210 along both vertical and horizontal directions. The etch step for removing portions of the layer 210B can include wet etching using a potassium hydroxide (KOH) solution, a tetramethylammonium hydroxide (TMAH) solution, or the like. The etch chemistry can be such that the layer 210B can be etched laterally as well as vertically, thereby increasing the volume of the opening 244A to form cavity 216. Further, the etching of layer 210B may be a selective etch to achieve the appropriate angle for the outcoupler. The etch chemistry can be such that any further etching of the layer 210C may be prevented. Additionally, in some examples, the supporting layer 242 may be a <111> oriented substrate, so that the etch chemistry (e.g., the potassium hydroxide (KOH) solution, a tetramethylammonium hydroxide (TMAH) solution, or the like) may not etch the supporting layer 242.

The etch chemistry used in step 364 can also be such that the etching can preferentially terminate on a plane, such as an upwards-facing (111) plane. In some examples, the substantially planar etched surface can form the outcoupler 209 (e.g., outcoupler 209 illustrated in FIG. 2F), which can have a certain angle (e.g., 45°) from the surface of the supporting layer 242. In some instances, the off-cut orientation of the layer 210B can be selected based on the targeted angle of the plane. Examples can include other angles of the outcoupler 209, which can be formed using other types of etches that terminate at other crystal planes.

In some examples, the cavity 216 can be filled with one or more materials, such as an insulating material (e.g., $SiO_2$) (step 366 of process 350). The insulating material may contact the outcoupler 209.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as set forth by the appended claims.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An integrated photonics device including:
    a supporting layer;
    a plurality of layers formed on the supporting layer, wherein the layers includes:
        one or more waveguides for propagating light, and
        one or more outcouplers for receiving the light and redirecting the light towards one or more optics, wherein the one or more outcouplers include portions formed from at least two of the plurality of layers;
    a cavity formed in the plurality of layers, wherein a wall of the cavity is formed by the one or more outcouplers; and
    an anti-reflection layer disposed on the plurality of layers, wherein the anti-reflection layer extends over the portions of the one or more outcouplers.

2. The integrated photonics device of claim 1, wherein the plurality of layers includes silicon nitride, and the supporting layer includes silicon.

3. The integrated photonics device of claim 1, wherein the one or more outcouplers provide a reflective surface for redirecting the light towards one or more optics.

4. The integrated photonics device of claim 1, wherein the one or more waveguides are located in a light generation region of the plurality of layers, and the one or more outcouplers are located in a light launch region of the plurality of layers.

5. The integrated photonics device of claim 4, wherein the anti-reflection layer disposed on at least some of the plurality of layers in the light launch region.

6. The integrated photonics device of claim 1, wherein the anti-reflection layer is further a hard mask for the plurality of layers.

7. The integrated photonics device of claim 1, further comprising:
    an insulating material that fills the cavity, the insulating material contacting at least one of the one or more outcouplers, wherein the insulating material is separate and distinct from the plurality of layers.

8. The integrated photonics device of claim 1, wherein the plurality of layers are included in an off-cut wafer.

9. The integrated photonics device of claim 1, wherein the one or more waveguides and the one or more outcouplers comprise the same material.

10. A method for forming an integrated photonics device, comprising:
    providing a wafer, the wafer including a supporting layer;
    a plurality of layers formed on the supporting layer; and
    forming one or more outcouplers from at least two layers of the plurality of layers, the formation of the one or more outcouplers including:
        depositing a hard mask layer on at least one of the plurality of layers, patterning the hard mask layer to form one or more openings next to a light launch region of the plurality of layers, and
        creating the one or more outcouplers by etching at least some of the plurality of layers through the one or more openings.

11. The method of claim 10, wherein creating the one or more outcouplers comprises:
    removing first portions of a first layer of the plurality of layers;

removing portions of a second layer of the plurality of layers; and removing second portions of the first layer of the plurality of layers.

12. The method of claim 11, wherein removing first portions of the first layer comprises etching the first layer in a first direction, the method further comprising:
after removing first portions of the first layer, wherein removing portions of the second layer comprises etching the second layer in at least a second direction, and before removing second portions of the first layer:
etching the first layer in the first direction; and
etching the second layer in at least the second direction.

13. The method of claim 11, wherein the removal of the portions of the second layer includes etching using at least one of a hydrofluoric (HF) vapor, buffered HF, or another HF solution.

14. The method of claim 11, wherein removing first portions of the first layer comprises etching using dry etching.

15. The method of claim 11, wherein removing second portions of the first layer comprises etching using a potassium hydroxide solution or a tetramethylammonium hydroxide solution.

16. The method of claim 11, wherein removing second portions of the first layer comprises using an etch solution that preferentially terminates etching the first layer along a plane.

17. The method of claim 11, wherein removing first portions of the first layer, the portions of the second layer, and the second portions of the first layer form a cavity, the method further comprising filling the cavity with one or more materials.

18. The method of claim 10, further comprising:
forming one or more waveguides in a light generation region of the plurality of layers.

19. The method of claim 18, wherein the one or more waveguides are located at the light generation region of the plurality of layers, and the one or more outcouplers are located at a light launch region of the plurality of layers.

20. An integrated photonics device formed by a process comprising the steps of:
providing a wafer, the wafer including a supporting layer and a plurality of layers on the supporting layer; and
forming one or more outcouplers from at least two of the plurality of layers, the formation of the one or more outcouplers including:
depositing a hard mask layer on at least one of the plurality of layers;
patterning the hard mask layer to form one or more openings next to a light launch region of the plurality of layers; and
creating the one or more outcouplers by etching at least some of the plurality of layers through the one or more openings.

* * * * *